May 4, 1965     C. L. SPORCK     3,181,329
METHOD OF FORMING RIBBED TUBES
Original Filed Sept. 1, 1960
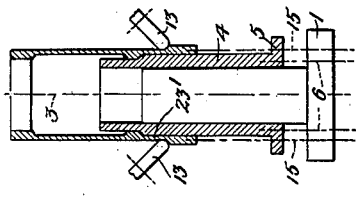
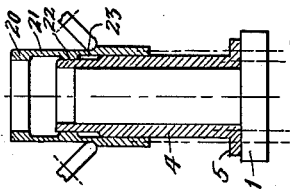
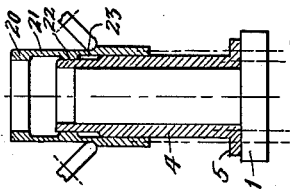
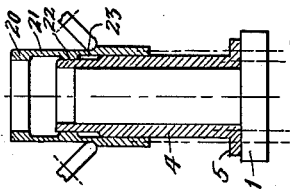
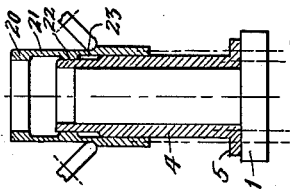
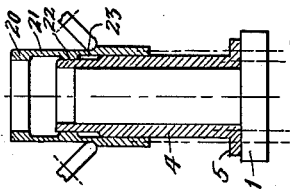
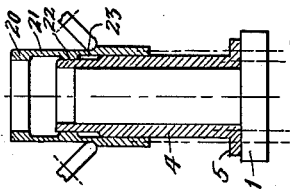
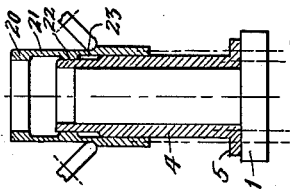
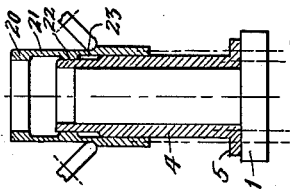
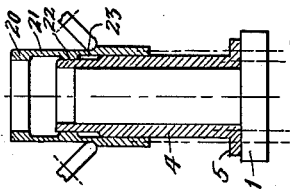
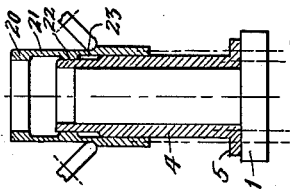
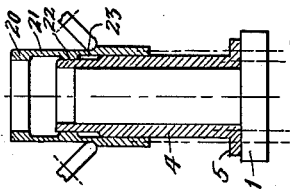
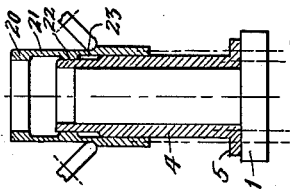
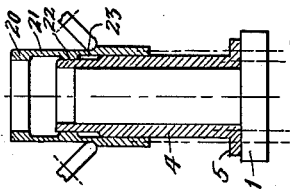
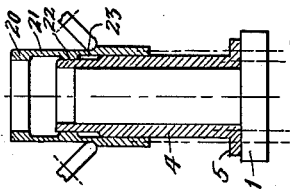
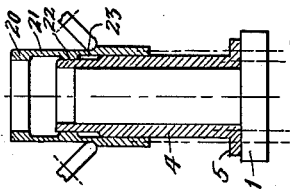
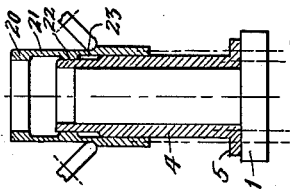
INVENTOR
Claus L. Sporck
BY
Synnestvedt & Lechner
ATTORNEYS

United States Patent Office 3,181,329
Patented May 4, 1965

---

3,181,329
METHOD OF FORMING RIBBED TUBES
Claus L. Sporck, Cincinnati, Ohio, assignor to The Lodge & Shipley Company, Cincinnati, Ohio, a corporation of Ohio
Continuation of application Ser. No. 53,488, Sept. 1, 1960. This application Oct. 8, 1963, Ser. No. 320,947
3 Claims. (Cl. 72—85)

This invention relates to the art of sheet metal working and, in particular, relates to improved methods for forming hollow articles having spaced-apart ribs. In general, the methods herein disclosed are improvements of the methods disclosed in my Patent No. 3,029,667.

This application is a continuation of my copending application Serial No. 53,488, filed September 1, 1960, now abandoned and entitled Metal Working.

One of the objects of the invention is to provide improved methods for the forming of hollow articles having axially spaced ribs by the shaping and the flowing of metal of a blank.

Another object of the invention is to provide improved methods for the forming of hollow articles having spaced axial ribs by predetermined relative movements as between a pair of dies and a blank disposed therebetween.

Another object of the invention is to provide improved methods of forming hollow articles having internal ribs, using a non-collapsible spindle and a plurality of rollers cooperating therewith.

Another object of the invention is to provide improved methods of forming hollow articles having axially spaced ribs by changing the diameter and length of a starting blank, said change providing for the formation of alternate thin and thick sections, the thicker sections serving as ribs for the article formed.

How the foregoing is accomplished, together with other objects and advantages of the invention will be apparent from the following description and drawings wherein:

FIGURES 1 through 7 illustrate typical steps involved in one embodiment of the invention;

FIGURES 8 through 12 illustrate a modification of the steps of FIGURES 1 through 7; and FIGURES 13 through 17 illustrate typical steps involved in another embodiment of the invention.

Unless otherwise required by the context, or limited by the prior art, the following terms will have the indicated meanings. The term "hollow" as used herein will be understood to apply generally to an article which is tubular or cylindrical in shape, and the term "sheet metal" is inclusive of plate, sheet and plate-like elements, even when formed as castings, forging, weldments or the like.

FIGURE 1 is illustrative of the general type of equipment which can be used to practice the inventions herein disclosed. A support 1 having a cylindrically-shaped extension 2 is adapted (by means not shown) to be mounted for rotation about the axis 3 but to be non-movable along said axis. A sleeve or spindle 4 is disposed on the extension 2 and has an annular foot portion 5 adapted to abut the support as shown. The spindle 4 is mounted so that it is rotatable with the support but movable axially thereof, said motions being accommodated, for example, by a keyway (not shown). Mechanism (not shown but generally indicated by the dot and dash lines 6) is provided so that the axial movement of the spindle is controllable. The spindle has a first annular working surface 10 and a second annular working surface 11 which is of smaller diameter than the first, and these working surfaces are interconnected by a third working surface 12. The spindle just described may be generally termed a die for reasons which will be apparent hereinafter. Disposed adjacent the spindle are rollers 13—13 having working surfaces 14—14. The rollers are adapted to be mounted on mechanism (not shown) providing for the rotation of the rollers and also for movement both axially and radially of the spindle.

With the rollers moved away from the spindle, a cylindrically shaped blank B is mounted on the spindle in the manner shown. Preferably the blank is of a length such that its outer end is in juxtaposition with the working surface 12. Mechanism (not shown but generally indicated by the dot and dash lines 15) is provided so that the blank is controllably movable along or with respect to the axis 3. The mechanisms controlling the axial movement of the blank and spindle are adapted to be coordinated in a manner which will be apparent hereinafter.

The preferred manner for practicing the invention will now be described in connection with FIGURES 2 through 7. In this embodiment the rollers are adapted to remain fixed in position while either the blank or the spindle is movable axially, or these are moved axially in unison.

With the various parts arranged as shown in FIGURE 1 and the spindle, blank and rollers rotating, the rollers and spindle are held in fixed axial position while the blank is moved axially outwardly (away from the support 1) to the position as indicated in FIGURE 2. With the outward movement, the upper portion of the blank is forced between the rollers and spindle and comes in contact with the second and third forming surfaces of the spindle. This necks the blank and thus forms the rib 20. The rollers are spaced from the forming surfaces so that the thickness $t$–$1$ of the rib is substantially the same as the original thickness $t$–$2$ of the blank. It will be observed that the over-all length of the blank is shortened.

With the parts in the position shown in FIGURE 2, the spindle is moved axially outwardly and the forming surface 12 engaging the blank causes the upper portion to also move outwardly. This results in the section of the blank adjacent the rib 20 being worked by the roller to form an annular section 21 (FIGURE 3) whose thickness $t$–$3$ is less than the thickness $t$–$1$ of the rib 20. The thickness $t$–$3$, of course, is controlled by the radial distance of the rollers from the annular surface 10. The axial length of the section 21 is determined by the total axial movement of the blank and spindle together. It will be noted that the over-all length of the blank is increased (with respect to the over-all length in FIGURE 2), so to accommodate this, the mechanism 15 controlling the blank is arranged to allow the lower part of the blank inwardly (toward the support 1).

With the roller and blank held in fixed axial position as shown in FIGURE 3, the spindle is then moved inwardly until the shoulder 5 abuts the support 1 and the parts are in the position as shown in FIGURE 4.

With the parts in the position of FIGURE 4, the rollers and spindle are held fixed axially and the blank is moved outwardly (FIGURE 5) so that the portion of the blank adjacent the section 21 is forced between the rollers and the working surfaces 12 and 14 whereby a second rib 22 is formed. Preferably for this step, the roller remains the same radial distance from the axis 3 so that the thickness of the rib 22 is the same as that of rib 20. This operation again shortens the over-all length of the blank (with respect to the over-all length in FIGURE 4) and to accommodate this, the mechanism 15 is arranged to allow the lower part of the blank to move inwardly.

With the parts in the position as shown in FIGURE 5, the rollers are held fixed axially and the spindle is moved axially outwardly and the forming surface 12 engaging the blank causes the upper portion to also move outwardly. This results in the section of the blank adjacent the rib 22 being worked by the roller to form the annular section 23. Preferably the roller remains the same radial distance from the axis 3 so that the thickness of the section 23 is the same as the thickness of the section 21, the length of the section 23 again being dictated by the total outward movement of the blank and spindle together. The over-all length of the blank is increased (with respect to the over-all length in FIGURE 5) and the mechanism indicated by 15 accommodates this movement.

With the parts in the position as shown in FIGURE 6, the spindle is again moved inwardly until the shoulder 5 contacts the support 1. If another rib is to be formed, the same procedure as described in connection with FIGURES 2 and 5 is initiated.

After the required number of ribs is formed, the rollers are moved away from the blank and the blank is easily slipped off the spindle.

FIGURES 8 through 12 show one manner in which long annular sections can be formed. For example, by comparing FIGURES 3 and 8, it will be apparent that in FIGURE 8 the spindle and blank have moved outwardly a greater axial distance than in FIGURE 3 so that the annular section 21' is of greater length than the section 21. As the spindle and blank continue to move outwardly, the end 24 of the blank contacts the shoulder 5 on the spindle, which then acts to push the blank. At this time, further movement of the spindle causes the blank to extrude outwardly as is shown in FIGURE 9, where it will be seen that the annular section 21" is of relatively large length. Since the lower end of the blank is effectively moving outwardly after the end contacts the shoulder 5, the mechanism indicated by 15 accommodates this motion.

With the parts in position as shown in FIGURE 9, the blank and rollers are held fixed axially and the spindle is moved inwardly until the shoulder 5 contacts the support 1 as shown in FIGURE 10. With the parts in this position, the blank can be moved outwardly in a manner already described so as to form the rib 22' as shown in FIGURE 11. With the parts in the position of FIGURE 11, the spindle then can be moved outwardly so as to form the annular section 23' in the manner already described.

In connection with the necking of the blank to form the first rib 20 (FIGURE 2), it will be apparent that this can be done in other ways, for example, by methods and means as disclosed in the above-mentioned copending application.

In FIGURES 13 through 17 I have shown an alternative method of practicing the invention herein. In this embodiment, the rollers rather than the spindle are movable axially with respect to the support.

After a rib 20' has been formed on the blank and the parts positioned as shown in FIGURE 2, the rollers are made to move axially toward the support 1 so as to work the blank and form the annular section 25 (see FIGURE 13). The thickness of the annular section depends upon the distance of the roller from the working surface 10 of the spindle and the length depends upon the total roller movement.

After the section 25 has been formed, the rollers and blank are moved to the position as shown in FIGURE 14. The rollers and spindle are held fixed and the blank is moved axially outwardly so that a rib 22" is formed (FIGURE 15). Then the rollers are again made to move toward the support 1 so that the second annular section 26 is formed (FIGURE 16). The rollers and blank are then moved until the parts assume the position as shown in FIGURE 17, and if another rib is to be formed, this is done as explained in connection with FIGURE 15.

I claim:
1. The method of forming a cylindrically-shaped article with ribs spaced along the axis thereof comprising the steps of:
 taking a cylindrically-shaped blank and forming a rib in the blank by applying a force on the blank along a helical path, the force being applied by imposing an inwardly directed radial force sequentially about the axis of the blank and simultaneously imposing an inwardly directed radial force sequentially along the axis of the blank, the forces being applied to inwardly neck a portion of the blank into a cylindrical shape, the necked portion having smaller inside and outside diameters than those of the unworked part of the blank, said necked portion constituting said rib;
 forming a wall in the blank by applying a force along a helical path, the force being applied by imposing on a section of said blank adjacent said rib an inwardly directed radial force sequentially about the axis and simultaneously imposing an inwardly directed radial force sequentially along the axis of the blank, the forces being applied to reduce the wall thickness of said adjacent section and to axially elongate the section, said reduced and elongated section constituting said wall; and
 forming a second rib adjacent said wall by applying a force along a helical path, the force being applied by imposing on a section of said blank adjacent said wall an inwardly directed radial force sequentially about the axis of the blank and simultaneously imposing an inwardly directed radial force sequentially along the axis of the blank, the forces being applied to inwardly neck last said section into a cylindrical shape, the necked section having smaller inside and outside diameters than those of the unworked part of the blank, and last said necked section constituting said second rib.

2. The method of forming a cylindrically-shaped article having internal ribs spaced along its axis comprising the steps of:
 rotating a cylindrically-shaped spindle having a first annular forming surface, a second annular forming surface of smaller diameter than the first, and a third surface interconnecting the first and second whereby to rotate a cylindrically-shaped blank mounted on said first surface;
 positioning a roller having a working surface radially outwardly of said second surface with the working surface engaged with the blank for rotation about an axis so that the path of relative rotational motion between the blank and the roller working surface is around the periphery of the blank and in said position the radial spacing between the roller working surface and said first surface being less than the thickness of the blank;
 by moving the blank along the spindle axis relative to the roller and spindle, forcing a portion of the blank between the roller working surface and the spindle to engage said second and third surfaces whereby to form a rib, during said blank movement the roller exerting an inward deforming force on the blank;
 by relatively moving the roller and spindle along said spindle axis, forcing a portion of the blank adjacent said rib between said roller working surface and said first forming surface whereby to form an annular wall section of lesser thickness than said rib; and
 by moving the unworked portion of the blank along said spindle axis relative to the roller and spindle, forcing a portion of the blank adjacent said annular wall section between the roller working surface and the spindle to engage said second and third surfaces whereby to form a second rib, during the blank movement the roller exerting an inward deforming force on the blank.

3. The method of forming a cylindrically-shaped article having at least one internal rib comprising the steps of:
 rotating a cylindrically-shaped spindle having a first annular-forming surface, a second annular-forming surface of smaller diameter than the first surface and a third surface interconnecting the first and second whereby to rotate a cylindrically-shaped blank mounted on said spindle, the blank engaging said first forming surface and the blank being characterized by an end which is necked inwardly, the neck engaging the third surface;

positioning a roller having a working surface radially outwardly of said second surface with the working surface engaged with said blank for rotation about an axis so that the path of relative rotational motion between the blank and roller working surface is about the periphery of the blank and in said position the radial spacing between the roller working surface and said first surface being less than the thickness of the blank;

by relatively moving the roller and spindle along said spindle axis, forcing a portion of the blank adjacent said end between said roller working surface and said first forming surface whereby to form an annular wall section; and by moving the unworked portion of the blank along said spindle axis relative to the roller and spindle, forcing a portion of the blank adjacent said wall section between the roller working surface and the spindle to engage said second and third surfaces whereby to form a rib, during the blank movement the roller exerting an inward deforming force on the blank and said rib being of greater thickness than said wall section.

References Cited by the Examiner
UNITED STATES PATENTS

| | | | |
|---|---|---|---|
| 1,999,324 | 4/35 | Esser | 29—544 |
| 2,010,400 | 8/35 | Klein | 80—62 |
| 2,062,415 | 12/36 | Harrison | 113—52 |
| 2,241,083 | 5/41 | Deischer. | |
| 2,593,772 | 4/52 | Larsson | 80—14 |

MICHAEL V. BRINDISI, *Primary Examiner.*